(12) United States Patent
Zelenay et al.

(10) Patent No.: US 7,550,223 B2
(45) Date of Patent: Jun. 23, 2009

(54) METHOD OF MAKING METAL-POLYMER COMPOSITE CATALYSTS

(75) Inventors: Piotr Zelenay, Los Alamos, NM (US); Rajesh Bashyam, Los Alamos, NM (US)

(73) Assignee: Los Alamos National Security, LLC, Los Alamos, NM (US)

(*) Notice: Subject to any disclaimer, the term of this patent is extended or adjusted under 35 U.S.C. 154(b) by 0 days.

(21) Appl. No.: 11/542,539

(22) Filed: Oct. 2, 2006

(65) Prior Publication Data

US 2007/0082804 A1 Apr. 12, 2007

Related U.S. Application Data

(60) Provisional application No. 60/724,552, filed on Oct. 6, 2005.

(51) Int. Cl.
*H01M 4/00* (2006.01)
*H01M 8/10* (2006.01)
*H01M 4/88* (2006.01)
*B01J 31/00* (2006.01)
*B01J 23/00* (2006.01)

(52) U.S. Cl. ............... 429/43; 429/30; 502/101; 502/152; 502/182; 502/185

(58) Field of Classification Search .......... 429/12–46; 502/101, 152, 182, 185
See application file for complete search history.

(56) References Cited

U.S. PATENT DOCUMENTS

2002/0132157 A1* 9/2002 Finkelshtain et al. .......... 429/43
2003/0175578 A1* 9/2003 Kim ............................ 429/42

FOREIGN PATENT DOCUMENTS

JP 2005-066592 * 3/2005

OTHER PUBLICATIONS

IPDL machine translation of JP 2005066592.*

\* cited by examiner

*Primary Examiner*—Dah-Wei D Yuan
*Assistant Examiner*—Maria J Laios
(74) *Attorney, Agent, or Firm*—Robert P. Santandrea; Juliet A. Jones

(57) ABSTRACT

A metal-polymer-carbon composite catalyst for use as a cathode electrocatalyst in fuel cells. The catalyst includes a heteroatomic polymer; a transition metal linked to the heteroatomic polymer by one of nitrogen, sulfur, and phosphorus, and a recast ionomer dispersed throughout the heteroatomic polymer-carbon composite. The method includes forming a heteroatomic polymer-carbon composite and loading the transition metal onto the composite. The invention also provides a method of making a membrane electrode assembly for a fuel cell that includes the metal-polymer-carbon composite catalyst.

20 Claims, 20 Drawing Sheets

METHOD OF MAKING METAL-POLYMER COMPOSITE CATALYSTS

REFERENCE TO PRIOR APPLICATION

This application claims the benefit of U.S. Provisional Application No. 60/724,552, filed Oct. 6, 2005.

STATEMENT REGARDING FEDERAL RIGHTS

This invention was made with government support under Contract No. DE-AC 52-06 NA 25396, awarded by the U.S. Department of Energy. The government has certain rights in the invention.

BACKGROUND OF INVENTION

The invention relates to fuel cells. More particularly, the invention relates to fuel cell electrodes. Even more particularly, the invention relates to a method of making cathode materials for fuel cell electrodes.

Polymer electrolyte fuel cells (PEFCs) have long been viewed as the power source of the future and the centerpiece of a hydrogen economy. However, in order to deliver on the long-standing promise of commercially viable PEFCs, the barriers of cost and performance durability must be overcome.

Presently, platinum is the material of choice for use as a catalyst in fuel cell electrodes. The high cost of platinum, however, presents a major obstacle to widespread use of PEFCs. In addition, platinum electrodes performance degrades in the presence of methanol, which is a fuel in direct methanol fuel cells (DFMCs).

Lowering fuel cell cost will only be possible by replacing today's platinum-based catalyst with other metal electrode materials of sufficient activity and stability. Therefore, what is needed is a fuel cell electrode that utilizes a metal other than platinum as an electrode catalyst. What is also needed is a method of making such electrode catalysts.

SUMMARY OF THE INVENTION

The present invention meets these and other needs by providing a method of making metal-polymer-carbon composite catalyst comprising a transition metal other than platinum. The catalyst is intended for use as a cathode electrocatalyst in fuel cells, including polymer electrolyte fuel cells, hydrogen-oxygen fuel cells, hydrogen-air fuel cells, and direct methanol fuel cells. The method includes forming a heteroatomic polymer-carbon composite and loading the transition metal onto the composite. The invention also provides a method of making a membrane electrode assembly that includes the metal-polymer-carbon composite catalyst.

Accordingly, one aspect of the invention is to provide a method of making a cathode catalyst, wherein the cathode catalyst comprises a heteroatomic polymer-carbon composite, a transition metal other than platinum linked to the heteroatomic polymer-carbon composite by one of nitrogen, sulfur, phosphorus, and oxygen, and a recast ionomer dispersed throughout the heteroatomic polymer-carbon composite. The method comprises the steps of: forming the heteroatomic polymer-carbon composite; loading the transition metal on the heteroatomic polymer-carbon composite to form a transition metal composite; and blending the recast ionomer with the transition metal composite to form the cathode catalyst.

A second aspect of the invention is to provide a method of making a membrane electrode assembly for a fuel cell, the membrane electrode assembly comprising: an ionomeric membrane, an anode catalyst disposed on a first surface of the ionomeric membrane; and a cathode catalyst disposed on a second surface of the ionomeric membrane, wherein the cathode catalyst comprises a heteroatomic polymer-carbon composite, a transition metal other than platinum linked to the heteroatomic polymer-carbon composite by one of nitrogen, sulfur, phosphorus, and oxygen, and a recast ionomer dispersed throughout the heteroatomic polymer-carbon composite. The method comprises the steps of: forming the heteroatomic polymer-carbon composite; loading the transition metal on the heteroatomic polymer-carbon composite to form a transition metal composite; blending the recast ionomer with the transition metal composite to form the cathode catalyst; applying the cathode catalyst to the first surface of the ionomeric membrane; and applying the anode catalyst to a second surface of the ionomeric membrane to form the membrane electrode assembly.

These and other aspects, advantages, and salient features of the present invention will become apparent from the following detailed description, the accompanying drawings, and the appended claims.

DETAILED DESCRIPTION

Figure 1:
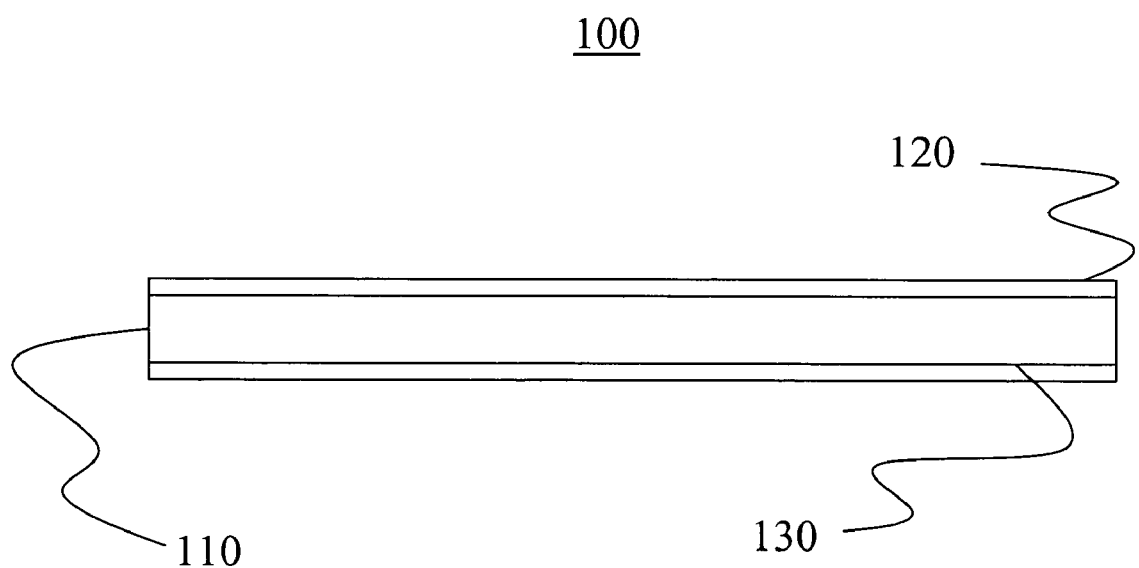
FIG. 1 is a schematic cross-sectional representation of a membrane electrode assembly of the present invention.

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other.

The present invention provides a metal-polymer-carbon composite catalyst comprising a transition metal other than platinum. The catalyst is intended for use as a cathode electrocatalyst in fuel cells, including polymer electrolyte fuel cells (also referred to herein as "PEFCs"), hydrogen-oxygen fuel cells, hydrogen-air fuel cells, and direct methanol fuel cells (also referred to herein as "DMFCs"). The invention also provides a membrane electrode assembly (also referred to herein as "MEA") for such fuel cells.

Referring to the drawings in general and to FIG. 1 in particular, it will be understood that the illustrations are for the purpose of describing a particular embodiment of the invention and are not intended to limit the invention thereto. FIG. 1 is a schematic cross-sectional representation of a membrane electrode assembly of the present invention. MEA 100 comprises an ionomeric membrane 110, a cathode catalyst composite 120 disposed on a first surface of ionomeric membrane 110, and an anode catalyst 130 disposed on a second surface of ionomeric membrane 110.

In one embodiment, ionomeric membrane 110 is Nafion® 117 (poly (perfluorosulphonic acid), also commercially available as Aciplex® or Flemion®). Other ionomeric membrane materials known in the art, such as sulfonated styrene-ethylene-butylene-styrene; polystyrene-graft-poly(styrene sulfonic acid); poly(vinylidene fluoride)-graft-poly(styrene sulfonic acid); poly(arylene ether), such as poly(arylene ether ether ketone) and poly(arylene ether sulfone); polybenzimidazole; polyphosphazene, such as poly[(3-methylphenooxy)(phenoxy)phosphazene] and poly [bis(3-methylphenoxy)phosphazene]; and combinations thereof, may also be used. Anode catalyst 130 comprises at least one metal. The at least one metal is selected from those metals, such as, but not limited to, platinum, ruthenium, palladium, and combinations thereof, that are known and used in the art as fuel cell anode materials. Anode catalyst 130 is typically deposited on ionomeric membrane 110 by preparing an ink containing the at least one metal and applying the ink to a surface of ionomeric membrane 110. In one embodiment, anode catalyst 130 comprises a mixture of platinum and ruthenium, such as, for example, platinum-ruthenium black.

Figure 2:
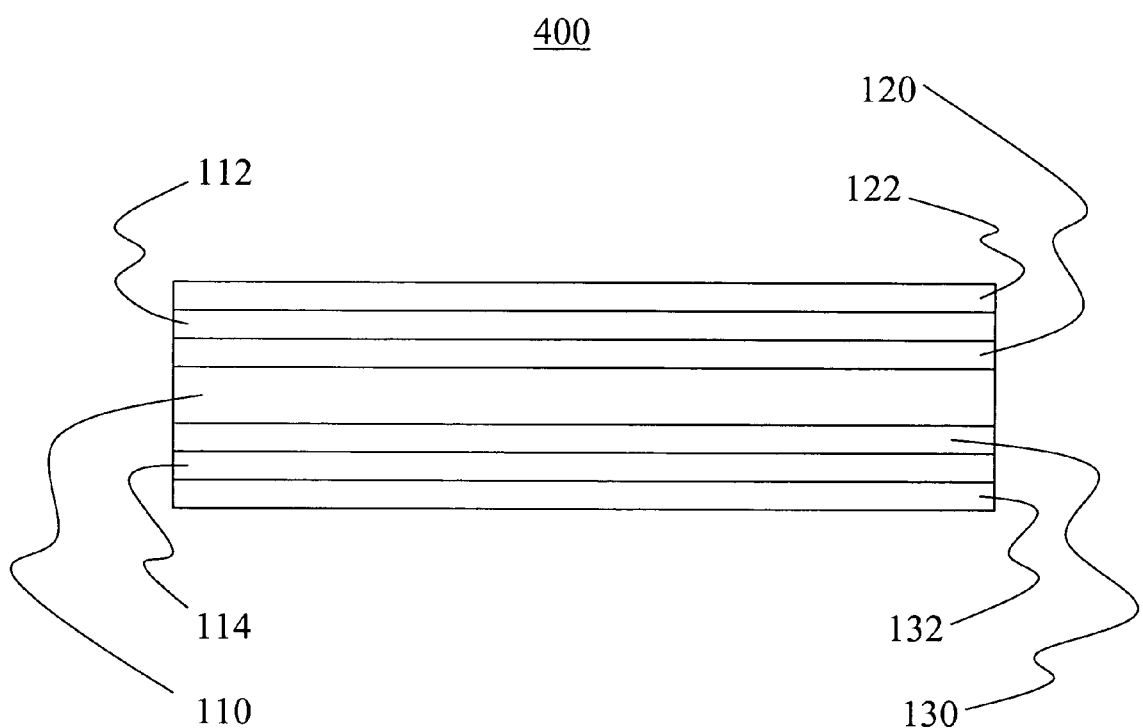
FIG. 2 is a schematic cross-sectional representation of a second embodiment of the membrane electrode assembly.

In another embodiment, shown in FIG. 2, a portion of anode catalyst 132 is additionally deposited on a surface of a first gas diffusion layer or "backing" 114. Gas diffusion layer 114 is then placed in contact with anode catalyst 130, which has been deposited on the first surface of ionomeric membrane 110. Similarly, a portion of cathode catalyst 122 may be deposited on a surface of a second gas diffusion layer 112, which in turn contacts cathode catalyst 120 deposited on the second surface of ionomeric membrane 110.

Alternatively, either cathode catalyst composite 120 and anode catalyst 130 may be disposed on a surface of gas diffusion layer 112, 114 that is in contact with a surface of ionomeric membrane 110. The gas diffusion layer may comprise carbon cloth, carbon paper, or other such materials that are known in the art. Contact between gas diffusion layers 112, 114 and ionomeric membrane 110 may be established, for example, by compression or hot-pressing.

Cathode catalyst 120 comprises a heteroatomic polymer-carbon composite, a transition metal linked to the heteroatomic polymer-carbon composite, and a recast ionomer dispersed throughout the heteroatomic polymer-carbon composite. As used herein, the term "heteroatomic polymer" refers to a polymer that includes atoms other than carbon and hydrogen. The heteroatomic polymer comprises one of nitrogen, sulfur, phosphorus, and oxygen. In one embodiment, the heteroatomic polymer is selected from the group consisting of polypyrrole, polyaniline, polythiophene, polyethylene dioxythiophene, polyfuran, poly(vinylpyridine), polyimide, and derivatives or combinations thereof. In a preferred embodiment, the heteroatomic polymer is polypyrrole.

Figure 3:
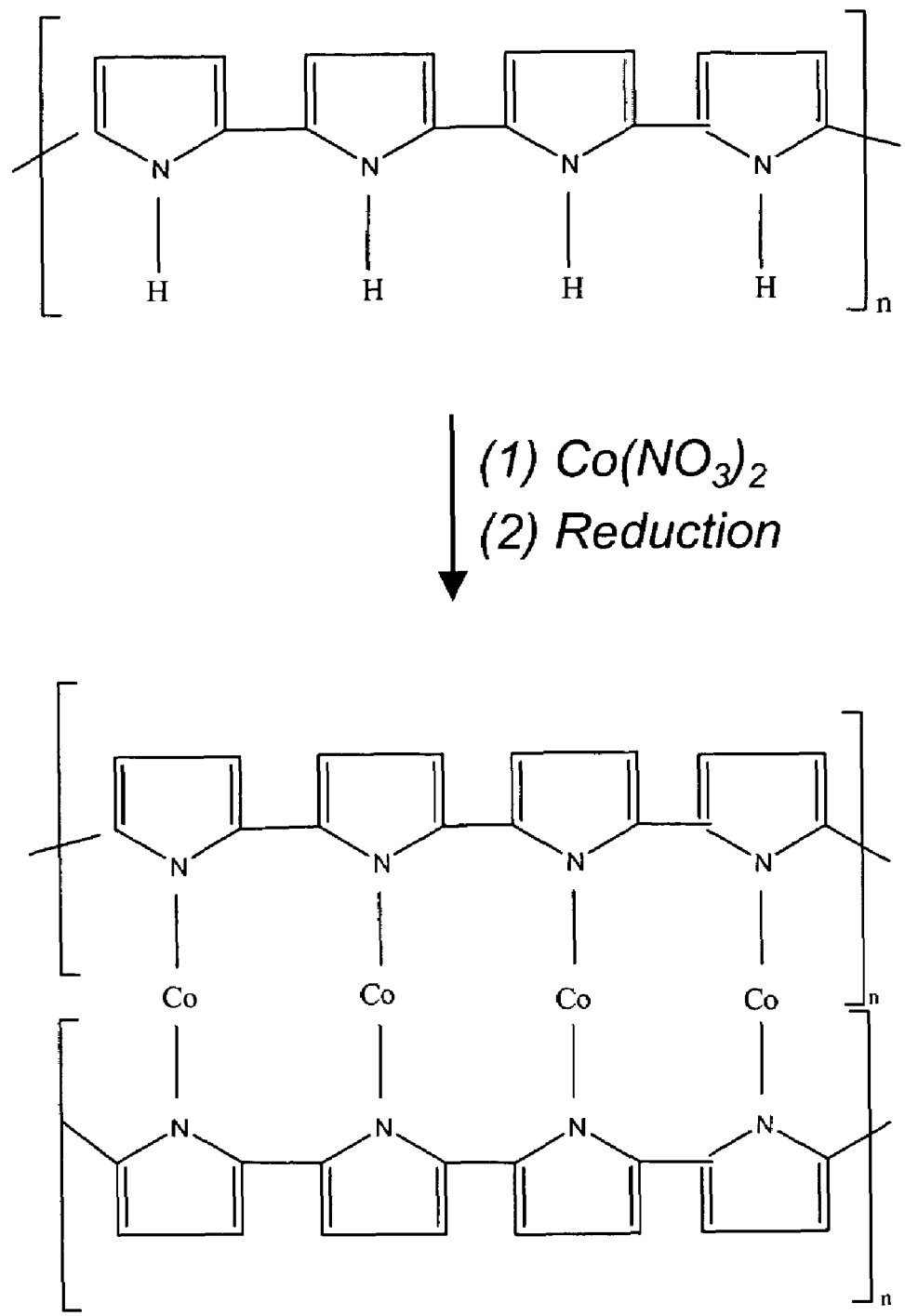
FIG. 3 is an equation representing the formation of a linkage of cobalt to polypyrrole by the reduction of cobalt.

The transition metal is linked to the heteroatomic polymer by one of nitrogen, sulfur, phosphorus, and oxygen. The transition metal is a metal other than platinum. In one embodiment, the transition metal is selected from the group consisting of cobalt, nickel, chromium, molybdenum, ruthenium, iron, manganese, palladium, vanadium, tungsten, and combinations thereof. In a preferred embodiment, the transition metal is cobalt. The linkage between polypyrrole and cobalt, formed by the reduction of cobalt ($Co^{2+}$) to Co, is shown in FIG. 3.

The recast ionomer is an ionic conductor such as, but not limited to; poly(perflourosulphonic acid), such as Nafion®, Aciplex®, or Flemion®; sulfonated styrene-ethylene-butylene-styrene; polystyrene-graft-poly(styrene sulfonic acid); poly(vinylidene fluoride)-graft-poly(styrene sulfonic acid); poly(arylene ether), such as poly(arylene ether ether ketone) and poly(arylene ether sulfone); polybenzimidazole; polyphosphazene, such as poly[(3-methylphenooxy)(phenoxy) phosphazene] and poly[bis(3-methylphenoxy)phosphazene]; and combinations thereof. In a preferred embodiment, the recast ionomer is Nafion®.

Figure 4:
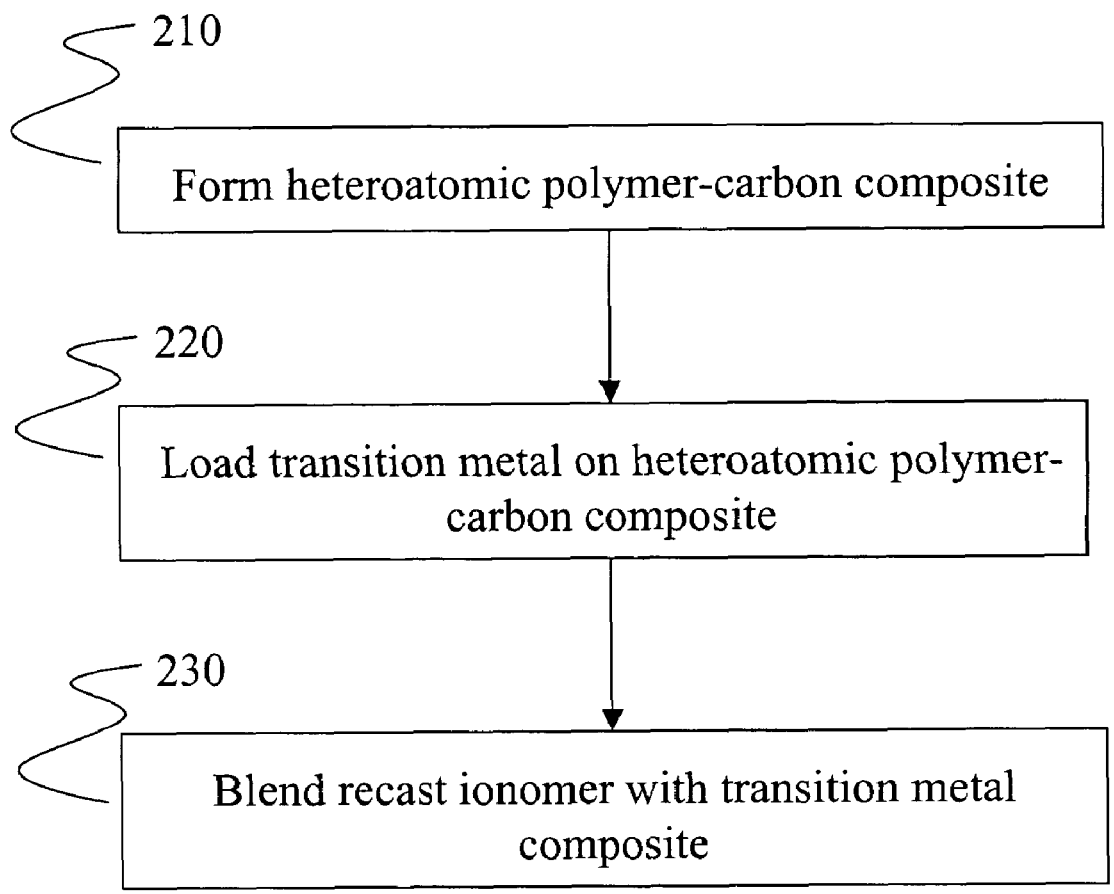
FIG. 4 is a flow chart for a method of making a cathode catalyst.

The present invention provides a method of making the cathode catalyst 120 described herein. A flow chart showing the method 200 is shown in FIG. 4. In step 210, a heteroatomic polymer-carbon composite is formed. In one embodiment, polymerization takes place by combining a dispersion comprising carbon black and a heteroatomic monomer with an oxidizing agent, such as hydrogen peroxide, potassium persulfate, ammonium persulfate, or the like.

A transition metal-heteroatomic polymer-carbon composite (also referred to herein as a "transition metal composite") is formed by loading the transition metal on the heteroatomic polymer-carbon composite in step 220 by combining a transition metal precursor, such as an inorganic salt or a metal-organic precursor of the transition metal, with the heteroatomic polymer-carbon composite and reducing the metal. The bond—or linkage—between polypyrrole and cobalt, formed by the reduction of cobalt ($Co^{2+}$), is shown in FIG. 3. In step 230, the transition metal composite is combined with the recast ionomer to form a cathode catalyst ink comprising the cathode catalyst 120.

Figure 5:
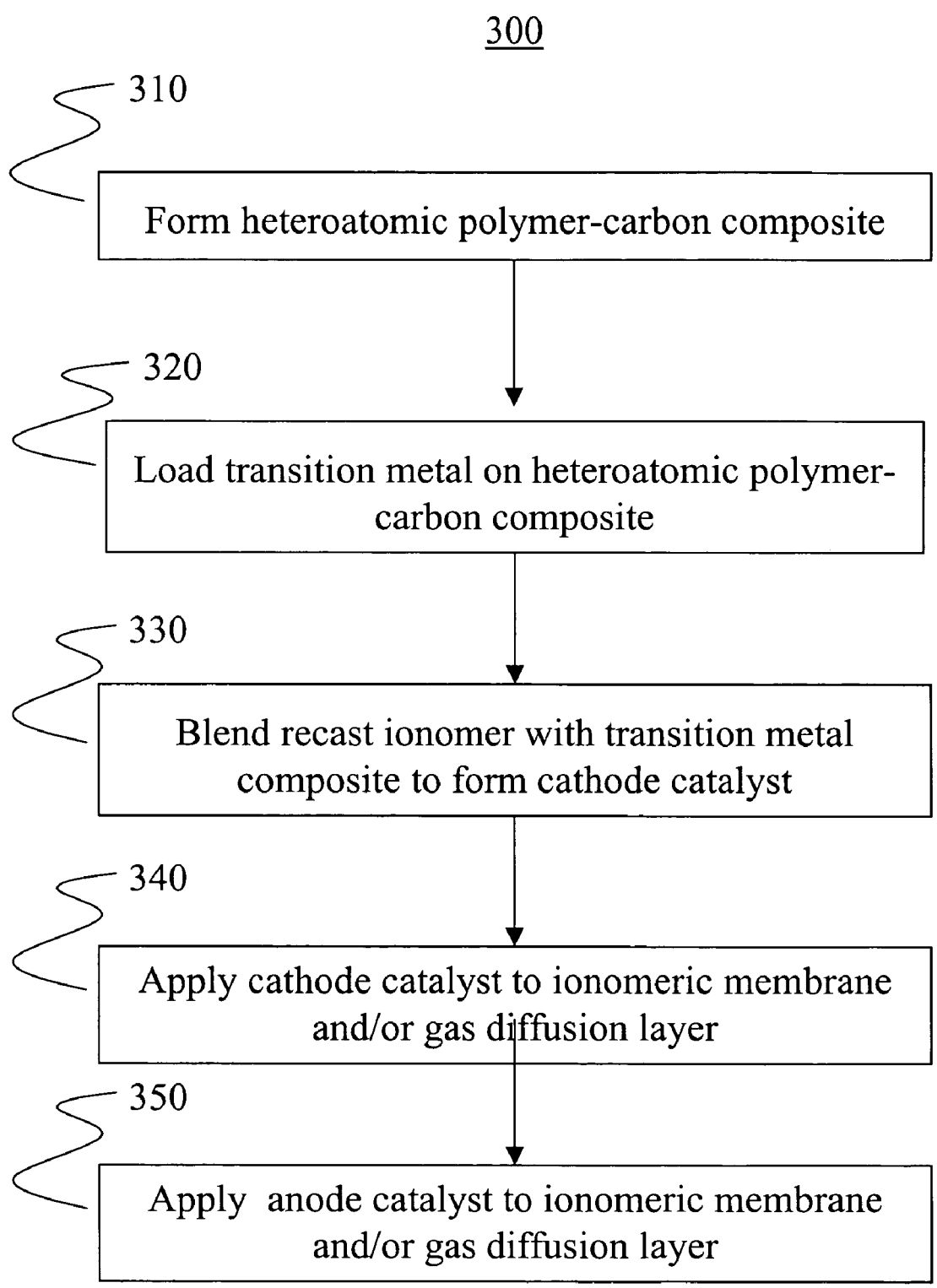
FIG. 5 is a flow chart for a method of making a membrane electrode assembly.

The invention also provides a method of making MEA 100 comprising cathode catalyst 120 and anode catalyst 130, described herein. FIG. 5 is a flow chart showing method 300. A heteroatomic polymer-carbon composite is first formed (step 310) and the transition metal is loaded on the heteroatomic polymer-carbon composite (step 320). In step 330, the transition metal composite is combined with the recast ionomer to form a cathode catalyst ink comprising the cathode catalyst. The anode catalyst is combined with the recast ionomer to form an anode catalyst ink. The cathode catalyst ink containing cathode catalyst is then applied to a surface of ionomeric membrane 110 in step 340, and the anode catalyst ink containing anode catalyst 130 is applied to another surface of ionomeric membrane 110 in step 350 to form MEA 100. In another embodiment, a portion of the anode catalyst ink is also applied to a surface of a first gas diffusion layer, and the gas diffusion layer is then placed in contact with a portion of anode catalyst ink that has been deposited on the first surface of ionomeric membrane 110. Similarly, a portion of the cathode catalyst ink may be applied to a surface of a second gas diffusion layer, which in turn contacts a portion of cathode catalyst ink that has been applied the second surface of ionomeric membrane 110. The anode catalyst and cathode catalyst inks may be applied to ionomeric membrane 110 or, alternatively, to gas diffusion layers 112, 114, using techniques such as, but not limited to, brush painting, doctor-blading, ultrasonic spraying, air spraying, screen-printing, decal transfer, and the like.

The cathode catalyst 120 described herein is stable and exhibits extraordinary selectivity for oxygen reduction reactions in the presence of methanol. Due to their methanol tolerance, the transition metal-polymer composite catalysts of the present invention are capable of operating in highly concentrated methanol solutions and are able to outperform Pt-based cathode catalysts at relatively low concentrations of methanol in the anode feed stream, in both regular separated flow fuel cells and mixed-reactant flow fuel cells.

The following examples illustrate the various features and advantages of the invention and are not intended to limit the invention thereto. While the examples refer to a cathode catalyst and MEA comprising cobalt and polypyrrole, it is understood that these materials represent a preferred embodiment of the invention, and that other metals and polymers described herein may also be used.

EXAMPLE 1

Preparation of a Heteroatomic Polymer-carbon Composite

A carbon dispersion was formed by adding 20 g of carbon black (Vulcan XC 72) and 5 mL of glacial acetic acid to 150 mL of deionized water and stirring for 20 minutes at room temperature. To the carbon dispersion, 4 g of pyrrole (ACROS) was added and stirred for 5 min. Other monomers that may be used include, but are not limited to, aniline, thiophene, 3-methyl thiophene, ethylene dioxythiophene, and the like. Next, 20 mL of 10% $H_2O_2$ were added as an oxidant and the mixture was stirred at room temperature for 1-3 hours. The polypyrrole-loaded carbon dispersion was filtered, washed with warm deionized water, and dried at 90° C. under vacuum for 6 hours. Other oxidants that may be used for polymerization include, but are not limited to, $FeCl_3$, $K_2S_2O_8$, $(NH_4)_2S_2O_8$, and the like. The monomer concentration can be varied between about 20 weight percent and 60 weight percent.

EXAMPLE 2

Cobalt Loading of Polypyrrole-carbon Composite

The polypyrrole-carbon composite (4.5 g) prepared in Example 1 was placed in a three-necked round bottom flask and intimately mixed with 100 mL of deionized water. The resultant dispersion was heated under reflux for 30 minutes with constant stirring, after which a solution of $Co(NO_3)_2 \cdot xH_2O$ (2.47 g in 25 mL of distilled water) was added. The obtained mixture was stirred between 75° C. and 80° C. for 30 minutes with vigorous stirring. A reducing agent for reducing the Co(II) ions was then added at 80° C. The reducing agent comprised $NaBH_4$ (5.23 g) and NaOH (0.37 g) dissolved in 500 mL of distilled water (pH=11.4). Other reducing agents, such as HCHO, $HCO_2H$, and the like, may also be used. The reducing agent was added at a rate of 20 mL per minute using a peristaltic pump. The pH during the reduction process was 11.1. The pH remained constant for 30 minutes, indicating that the reduction process was completed. The resulting catalyst was then filtered and washed repeatedly with warm de-ionized water until the pH of the filtrate reached 7.0. The catalyst was then dried overnight at 90° C. under vacuum. The cobalt loading under the experimental conditions described above was found to be 10%. The concentration of cobalt precursor can be varied to obtain a Co loading on the composite between about 10 weight percent and about 50 weight percent.

EXAMPLE 3

Preparation of Cathode Catalyst Electrode

Cathode catalyst ink was prepared by thoroughly blending the cobalt composite powder prepared in Example 2 with water and recast Nafion® ionomer. The cathode catalyst powder was combined with de-ionized water to achieve a 1:10 ratio by weight. An appropriate quantity of 5% Nafion® solution (1100 equivalent, Solution Technology, Inc.) needed to obtain a 1:1 volume ratio of the catalyst to Nafion® in the cathode catalyst layer 120 was added to the water-wetted catalyst. The solution was placed in an ice bath to prevent overheating and minimize evaporation of solvents and ultrasonically mixed for 90 seconds.

EXAMPLE 4

Preparation of Anode Catalyst Electrode

The procedure for making anode catalyst ink was similar to that used for cathode catalyst ink. The anode catalyst was a Pt/Ru black powder (Johnson Matthey), which was combined with de-ionized water to obtain a 1:10 ratio by weight. An appropriate quantity of 5% Nafion® solution (1100 equivalent, Solution Technology, Inc.) was added to the water-wetted catalyst to obtain a 1:1 volume ratio of the catalyst to Nafion® in the anode catalyst layer 130. The solution was placed in an ice bath to prevent overheating and minimize evaporation of solvents and ultrasonically mixed for 90 seconds.

EXAMPLE 5

Preparation of MEA

Figure 13:
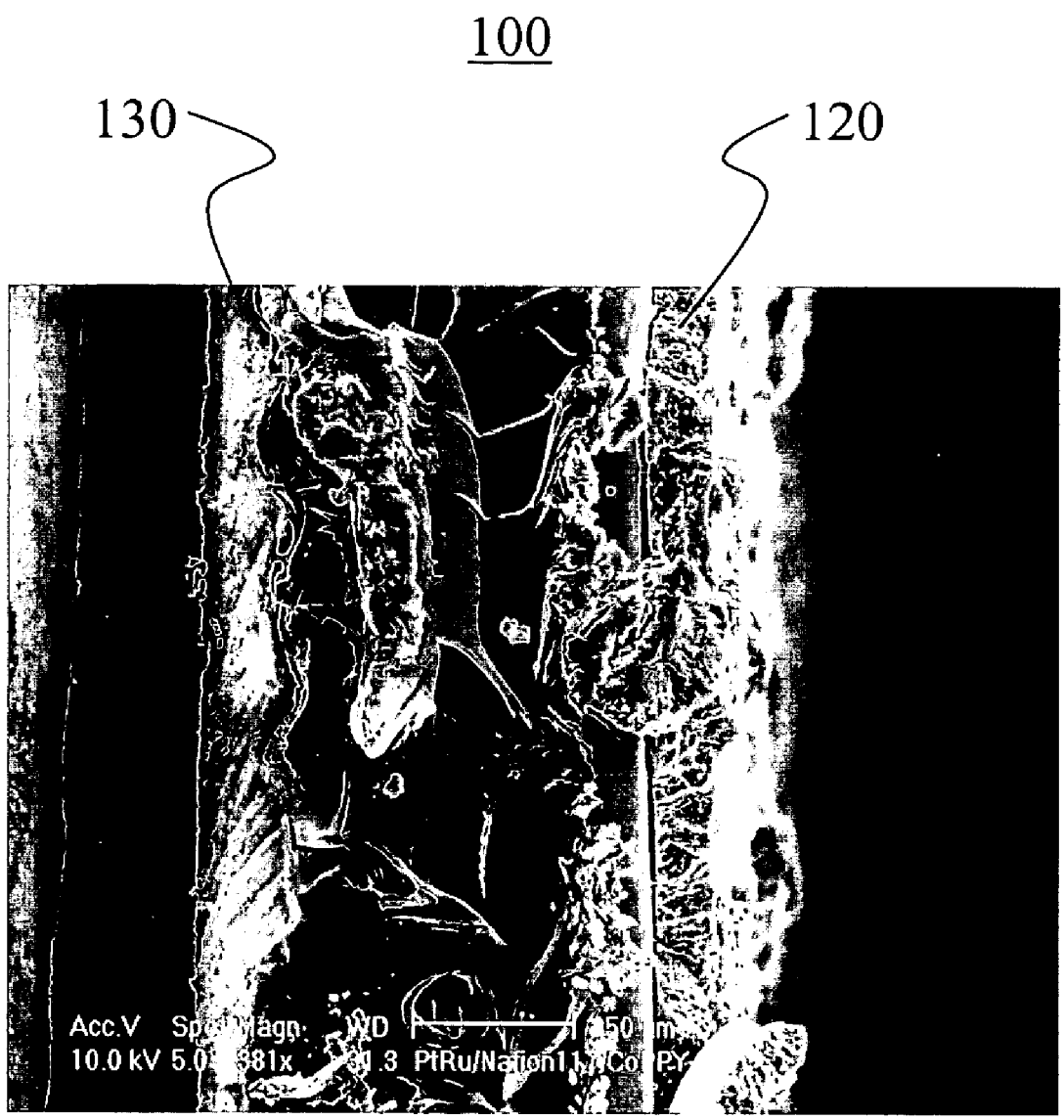
FIG. 13 is a scanning electron microscope (SEM) image of a membrane electrode assembly having a cobalt-polypyrrole-carbon composite cathode catalyst layer.

The anode catalyst and cathode catalyst inks prepared in Examples 3 and 4 were applied to an ionomeric membrane using brush painting. Other application methods, such as, but not limited to, doctor-blading, ultrasonic spraying, air spraying, screen-printing, and the like may also be used. While the ionomeric membrane Nafion® 117 was used in this example, other membranes and gas diffusion media may be used as well. A piece of an ionomeric membrane was placed on the top of a vacuum table that had been preheated to 75° C. The vacuum table was used to hold the membrane in place and avoid wrinkling while painting. Either of the anode ink or cathode ink was then applied to one side of the membrane using a camel hair brush. After the painting of the first electrode had been completed, the membrane was turned over and the electrode was painted on the other side. The vials containing the anode and cathode inks were cooled in an ice bath during painting and capped whenever possible to minimize evaporation of solvents. Upon completion of painting, the MEA was left on the heated vacuum table for an additional 30 minutes to allow the anode and cathode catalyst layers to cure. The MEA was then removed from the table and placed in a sealed plastic bag for future use. The anode and cathode catalyst loadings were approximately 6.0 mg/cm$^2$ Pt—Ru and 0.0.06 mg/cm$^2$ Co, respectively. A scanning electron microscope image of the MEA 100 is shown in FIG. 13. The thickness of cathode catalyst layer 120 was determined to be 15 μm.

The MEA was then assembled in standard 5 cm$^2$ fuel cell hardware. Hydrophobic double-sided and single-sided carbon-cloth gas diffusion layers (backings) from De Nora USA (E-TEK, Inc.) were used on the cathode and the anode sides of the cell, respectively.

EXAMPLE 6

Fuel Cell Performance

The performance of the MEAs and cathode catalysts described in the preceding examples was tested in hydrogen-oxygen and hydrogen-air fuel cells. Performance was tested at 30° C., 50° C., 70° C., and 80° C. The flow rates of hydrogen and air were 300 sccm and 466 sccm, respectively. The gases were humidified at 90° C. and 80° C. for the anode and cathode, respectively. The backpressure on both sides of the cell was 30 psig.

Figure 6:
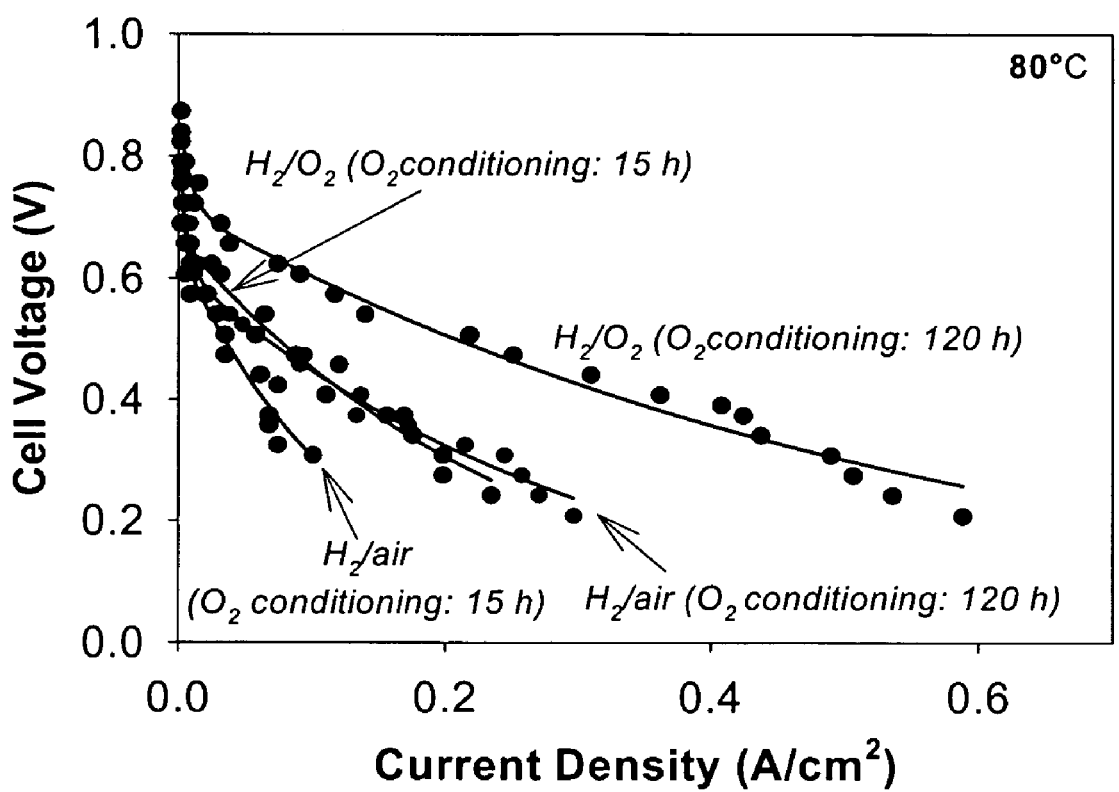
FIG. 6 is a plot of steady-state polarization curves obtained in $H_2$/air and $H_2/O_2$ fuel cells having a cobalt-polypyrrole-carbon composite cathode (0.06 mg/cm$^2$ Co) and a commercially available platinum-ruthenium black anode (6.0 mg/cm$^2$ Pt—Ru)

Steady state polarization curves obtained at 80° C. with a cobalt-polypyrrole-carbon cathode (0.06 mg/cm$^2$ Co) and a commercially available Pt—Ru black anode (6.0 mg/cm$^2$ Pt—Ru) are shown in FIG. 6. The polarization curves in FIG. 6 demonstrate that fuel cell performance in H$_2$/O$_2$ and H$_2$/air fuel cells is dramatically increased by conditioning in oxygen.

Figure 7:
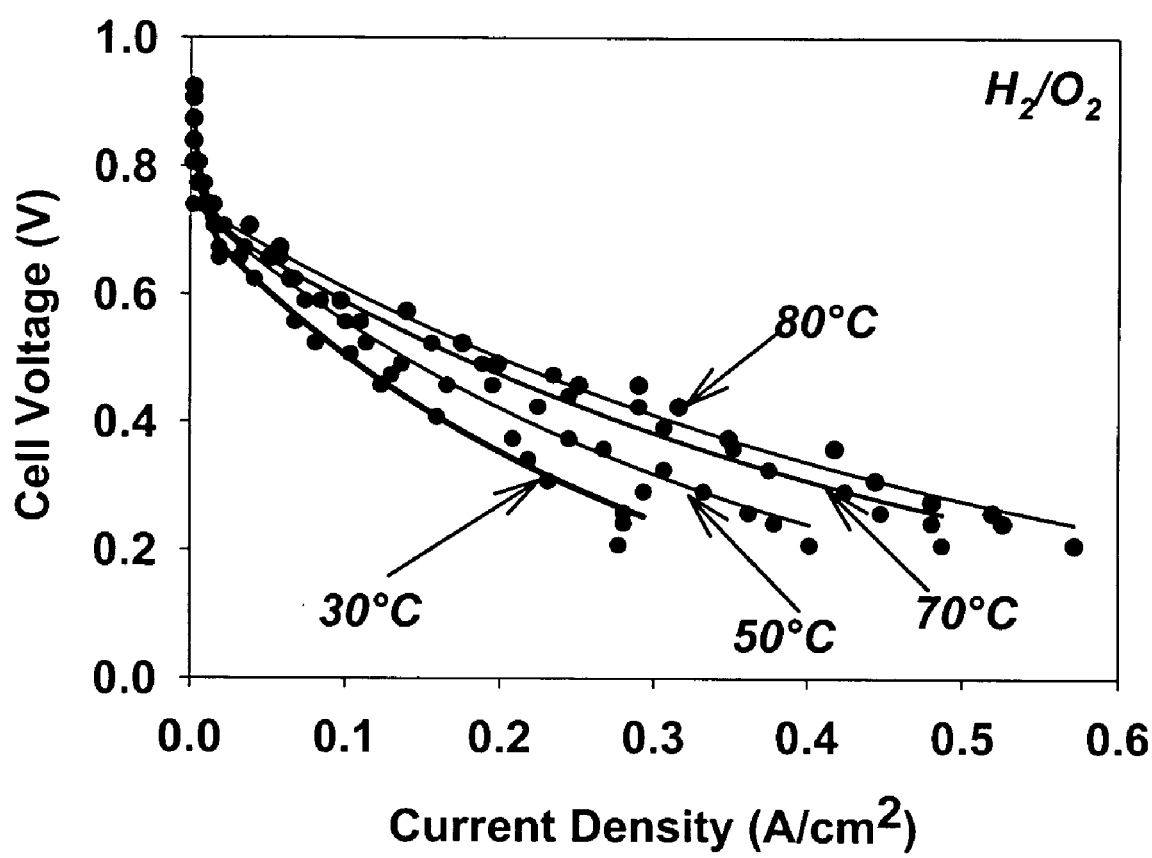
FIG. 7 is a plot of hydrogen-oxygen fuel cell polarization measured at different cell temperatures for a membrane electrode assembly having a cobalt-polypyrrole-carbon composite cathode catalyst.

Hydrogen-oxygen fuel cell polarization plots obtained for an MEA having a Co-polypyrrole-carbon composite cathode at different cell temperatures are shown in FIG. 7. Fuel cell performance improves with increasing cell temperature, and the Co-polypyrrole-carbon composite cathode catalyst demonstrates high catalytic activity.

Figure 8:
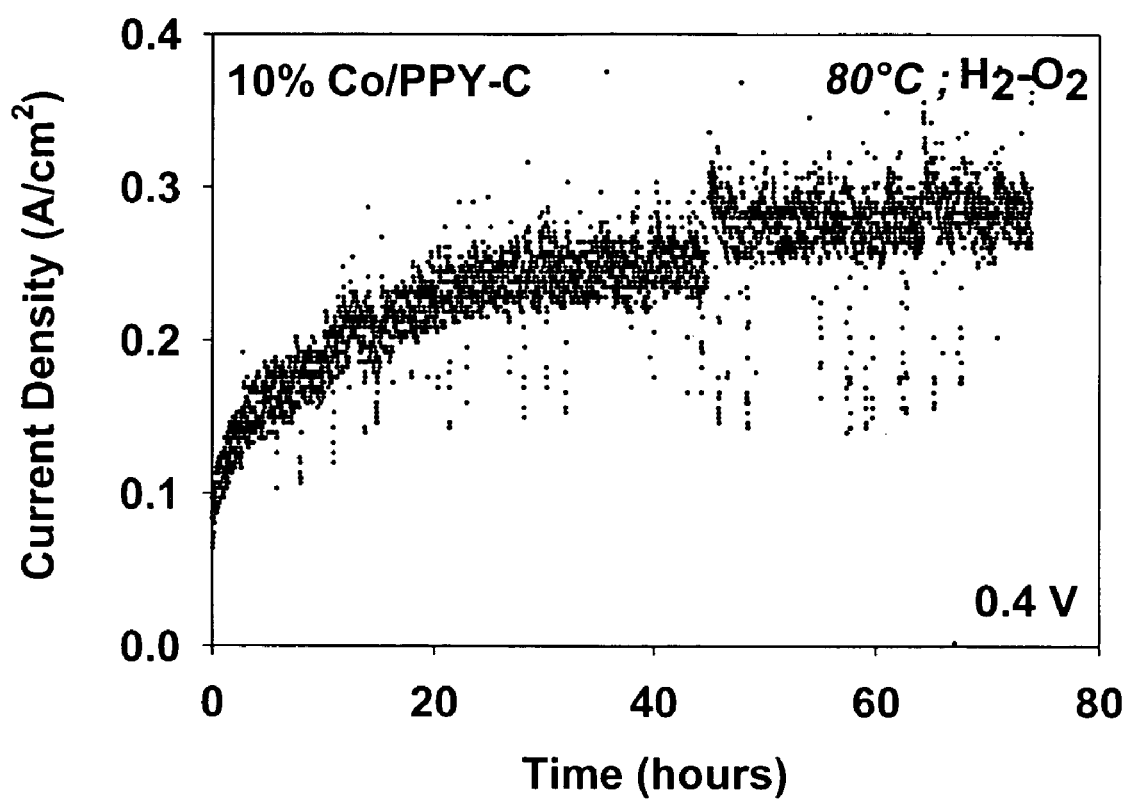
FIG. 8 is a plot of a life test at 80° C. for a $H_2/O_2$ fuel cell having a cobalt-polypyrrole-carbon composite cathode and a platinum-ruthenium black anode.

The life test performance of the Co-polypyrrole-carbon composite cathode catalyst in H$_2$/O$_2$ fuel cells is shown in FIG. 8. The performance of the fuel cell increases during fuel cell operation, possibly indicating that catalytically inactive species that remain after the synthesis step are gradually removed from the catalyst surface during fuel cell operations.

Figure 9:
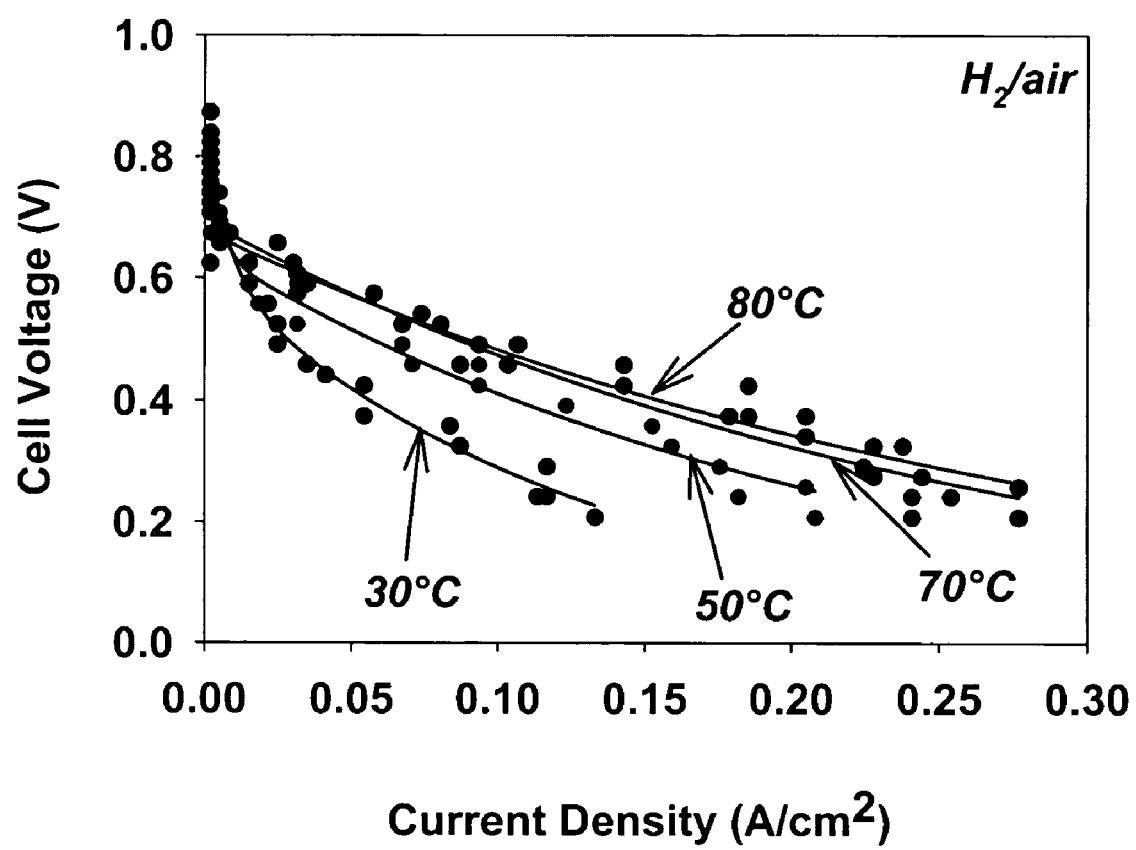
FIG. 9 is a plot of hydrogen-air fuel cell polarization measured at different cell temperatures for a membrane electrode assembly having a cobalt-polypyrrole-carbon composite cathode catalyst.

FIG. 9 shows hydrogen-air fuel cell polarization plots obtained at different cell temperatures for the MEA having a Co-polypyrrole-carbon composite cathode catalyst. The results show that fuel cell performance improves with increasing temperature.

Figure 10:
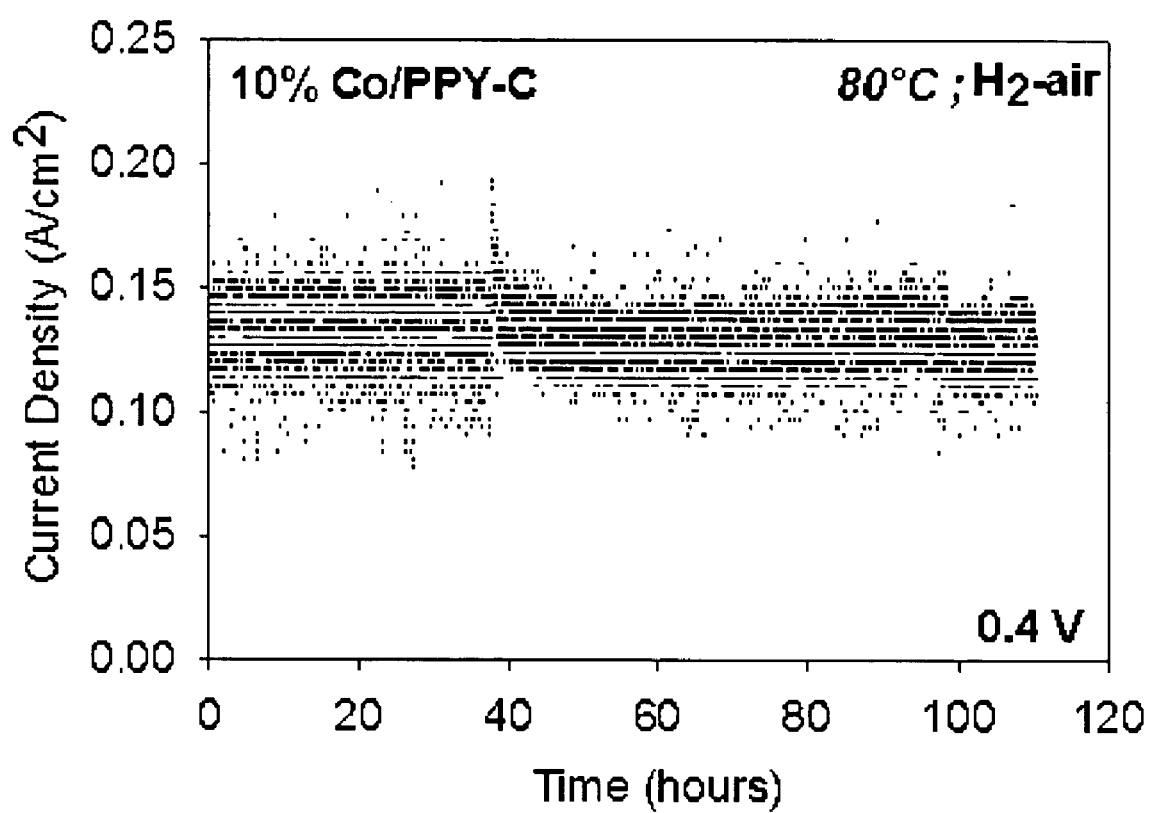
FIG. 10 is an $H_2$/air fuel cell life test at 80° C. using a cobalt-composite cathode and a platinum-ruthenium black anode.

The life-test activity of the MEA having a Co-polypyrrole-carbon composite cathode catalyst in an H$_2$/air fuel cell at 0.4 V is shown in FIG. 10. The MEA showed no decline in the current output after more than 110 hours of continuous operation—a major achievement for a fuel cell operating with a cathode that does not include a precious metal such as platinum.

Figure 14:
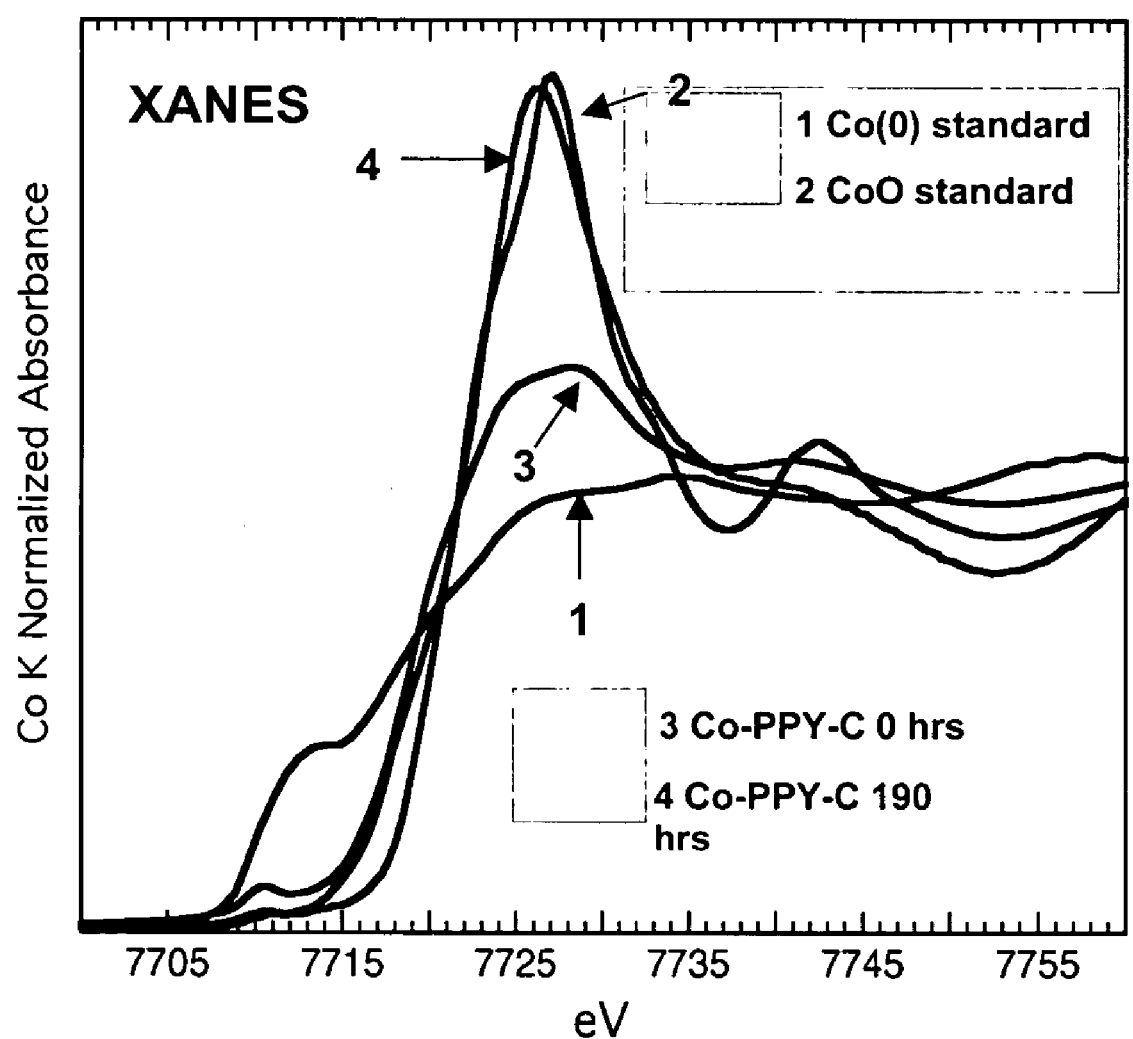
FIG. 14 is a plot of x-ray absorption near edge structure (XANES) spectra of a cobalt-polypyrrole-carbon composite before and after fuel cell operation in comparison to Co(0) and CoO standards.
Figure 15:
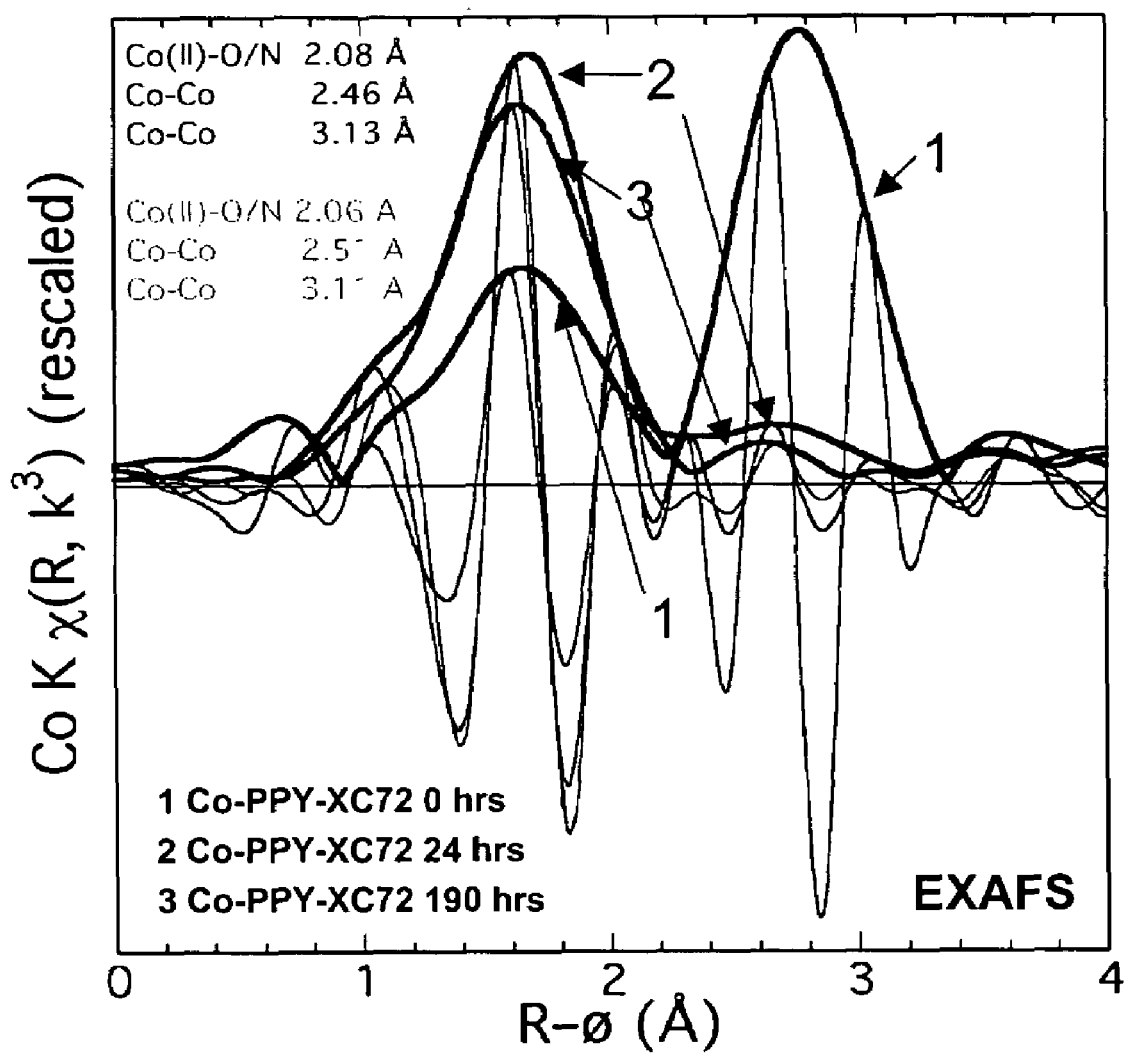
FIG. 15 is a plot of x-ray absorption fine structure (XAFS) spectra of a cobalt-polypyrrole-carbon composite before and after fuel cell operation in comparison to a CoO standard.

The composite catalysts were characterized before and after fuel cell operation using x-ray absorption near-edge structure (XANES) and x-ray absorption fine structure (XAFS) spectroscopy. FIG. 14 shows XANES spectra obtained for a cobalt-polypyrrole-carbon composite before and after fuel cell operation, as well as spectra for Co(0) and CoO standards. The spectra indicate that the as-synthesized catalyst contains both Co(0) and Co(II) states, the ratio of which decreases during catalyst break-in. A plot of XAFS spectra of a cobalt-polypyrrole-carbon composite before and after fuel cell operation is comparison to a CoO standard is shown in FIG. 15. The XAFS data shown in FIG. 15 reveals that during the break-in, most of the Co(0) is transformed into Co(II). XAFS data analysis reveals that Co(II) formed during catalyst break-in is likely to be stabilized in the polymer composite via a linkage either to nitrogen or, less likely, oxygen.

Figure 16:
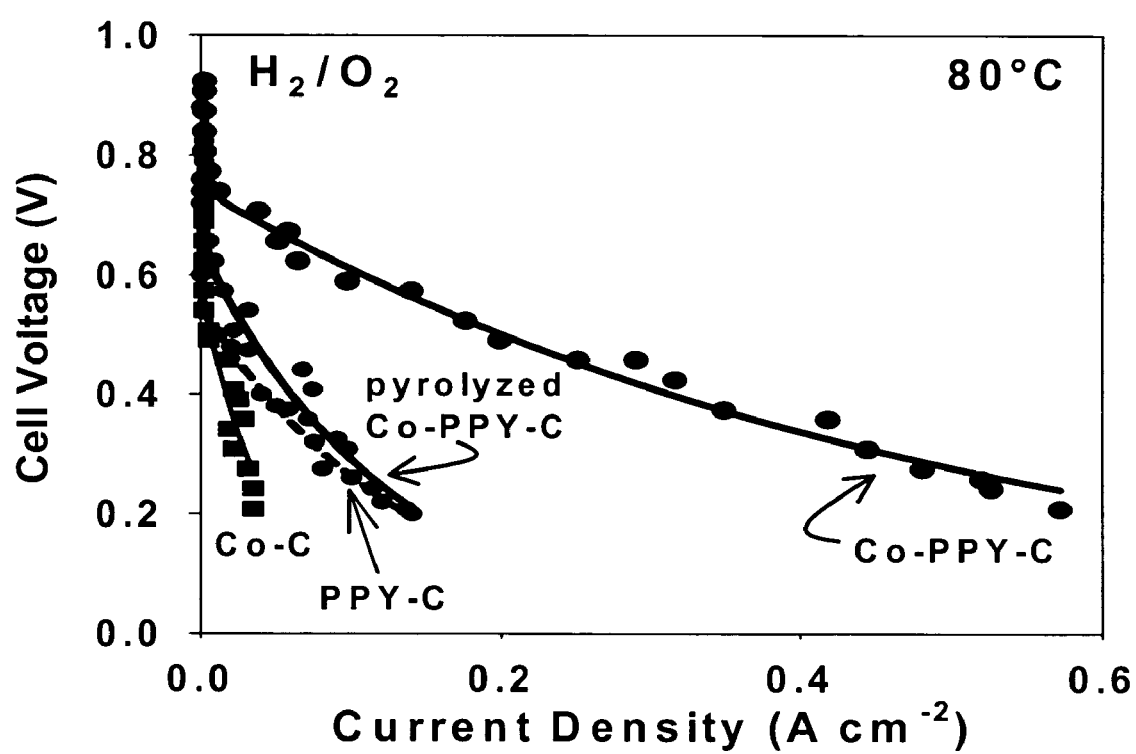
FIG. 16 is a plot of hydrogen-oxygen fuel cell polarization with different cathodes: (i) non-pyrolyzed cobalt-polypyrrole-carbon (Co—PPY—C) composite; (ii) pyrolyzed cobalt-polypyrrole-carbon composite; (iii) cobalt deposited on carbon (Co—C); and (iv) polypyrrole-carbon (PPY—C)

Polarization plots (FIG. 16) provide performance comparison of different cathode materials in H$_2$—O$_2$ fuel cells. Non-pyrolyzed composite cobalt-polypyrrole-carbon catalyst ("Co—PPY—C" plot in FIG. 16) allows a fuel-cell current density of 0.35 A cm$^{-2}$ at 0.40 V to be achieved. However, the same catalyst shows significantly diminished performance after having been pyrolyzed at 800° C. in nitrogen atmosphere for two hours ("pyrolyzed Co—PPY—C" plot in FIG. 16, 0.08 A cm$^{-2}$ current density at 0.40 V). This decrease in performance indicates that the catalyst loses most of the active oxygen reduction reaction (ORR) sites upon pyrolysis. Even lower oxygen-reduction activity can be seen with a catalyst obtained by merely depositing cobalt on carbon ("Co—C" plot in FIG. 16, 0.02 A cm$^{-2}$ current density at 0.40 V). The superior performance of non-pyrolyzed Co-PPY-C catalyst with respect to pyrolyzed Co—PPY—C and PPYfree Co—C indicates that ORR activity is gained from entrapment of Co sites in the polypyrrole matrix, possibly accompanied by the formation of $CoN_x$ active sites. Catalyst material obtained by reducing PPY—C—i.e., without any cobalt present—also exhibits a measurable catalytic activity (~0.05 A cm$^{-2}$ current density at 0.40 V), similar to that obtained with the pyrolyzed composite. In general, however, the test data clearly indicate that formation of the most active ORR sites require both the presence of a transition metal (e.g., Co, Fe, etc.) and the heteroatomic polymer.

Figure 17:
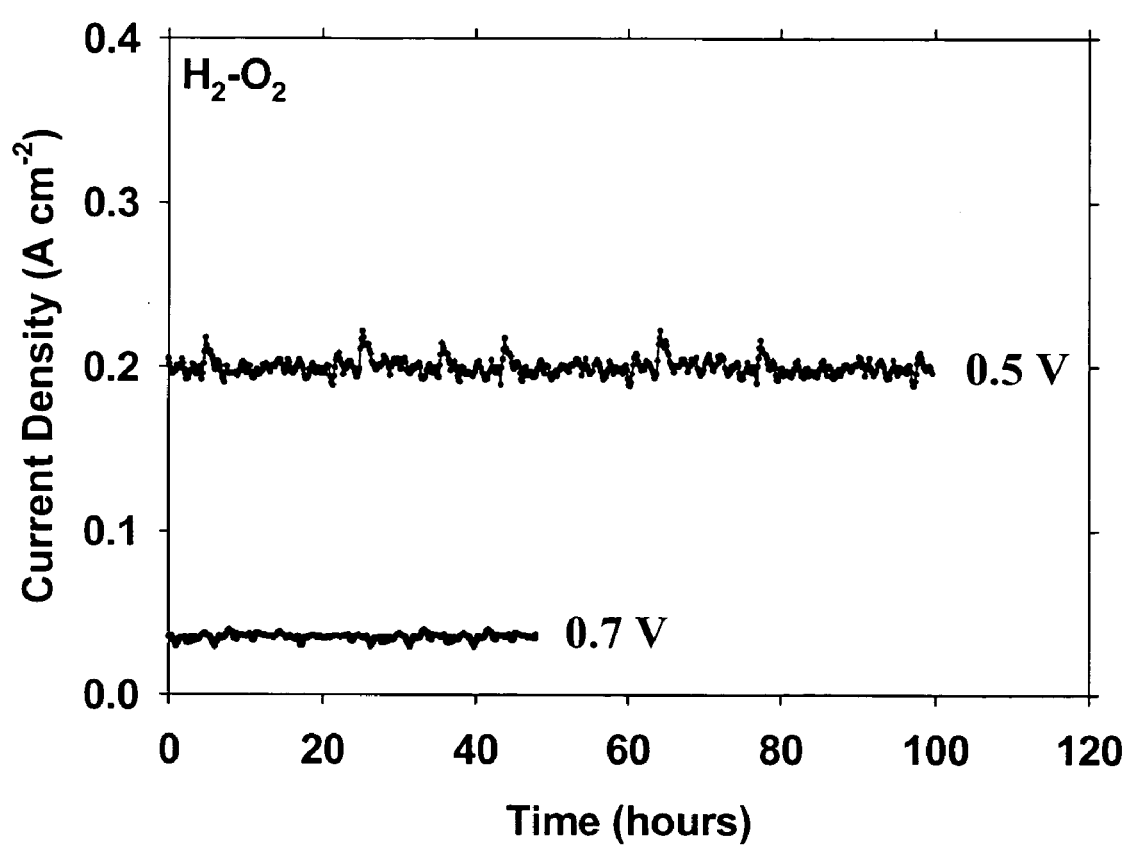
FIG. 17 is a plot of 100-hour and 50-hour life tests at 50 0.5 V and 0.7 V, respectively, life test, both performed at 80° C., on $H_2/O_2$ fuel cells having a cobalt-polypyrrole-carbon composite cathode and a platinum-ruthenium black anode.
Figure 18:
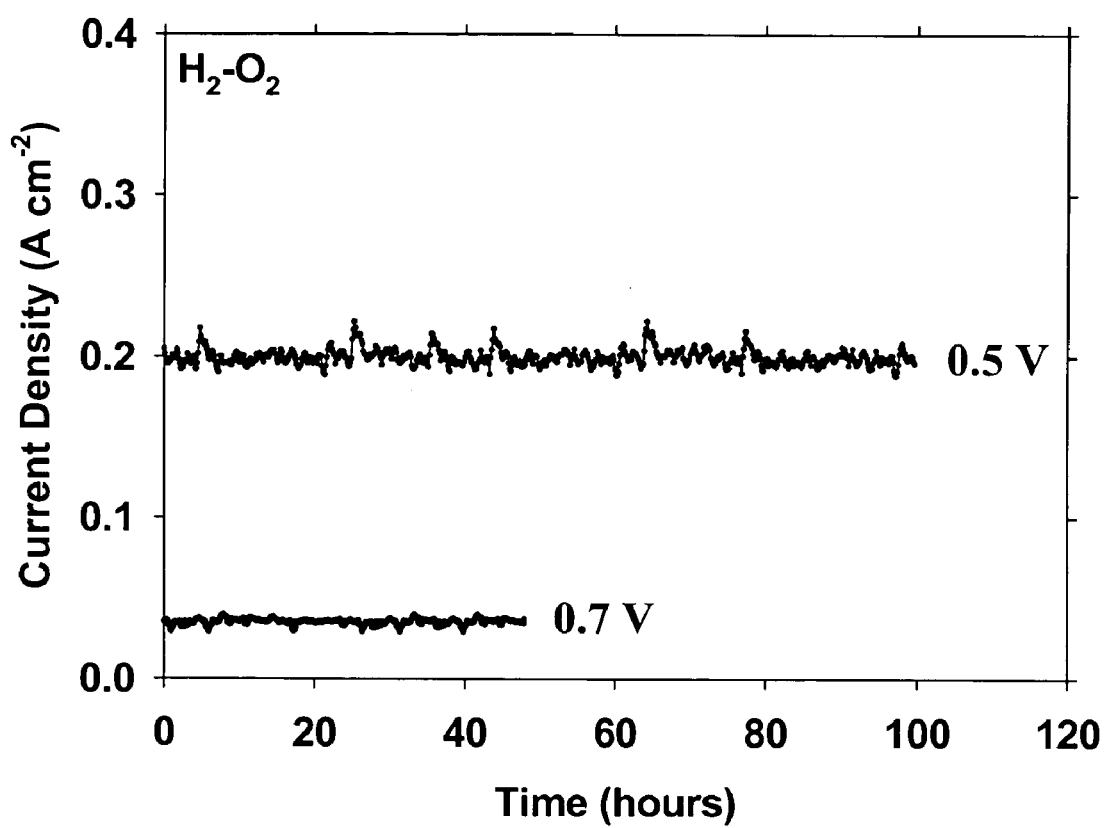
FIG. 18 is a plot of 100-hour life tests at 0.5 V and 0.6 V, both performed at 80° C., for $H_2$/air fuel cells having a cobalt-polypyrrole-carbon composite cathode and a platinum-ruthenium black anode.

The stability of the cobalt composite catalyst has been evaluated both in $H_2$—$O_2$ (FIG. 17) and $H_2$-air (FIG. 18) fuel cells at voltage voltages between 0.5 and 0.7 V. These voltages are higher than that used (0.4 V) in the life test shown in FIG. 10. It is evident from the data shown in FIGS. 17 and 18 that the cobalt composite catalyst is also stable at higher voltages.

Figure 19:
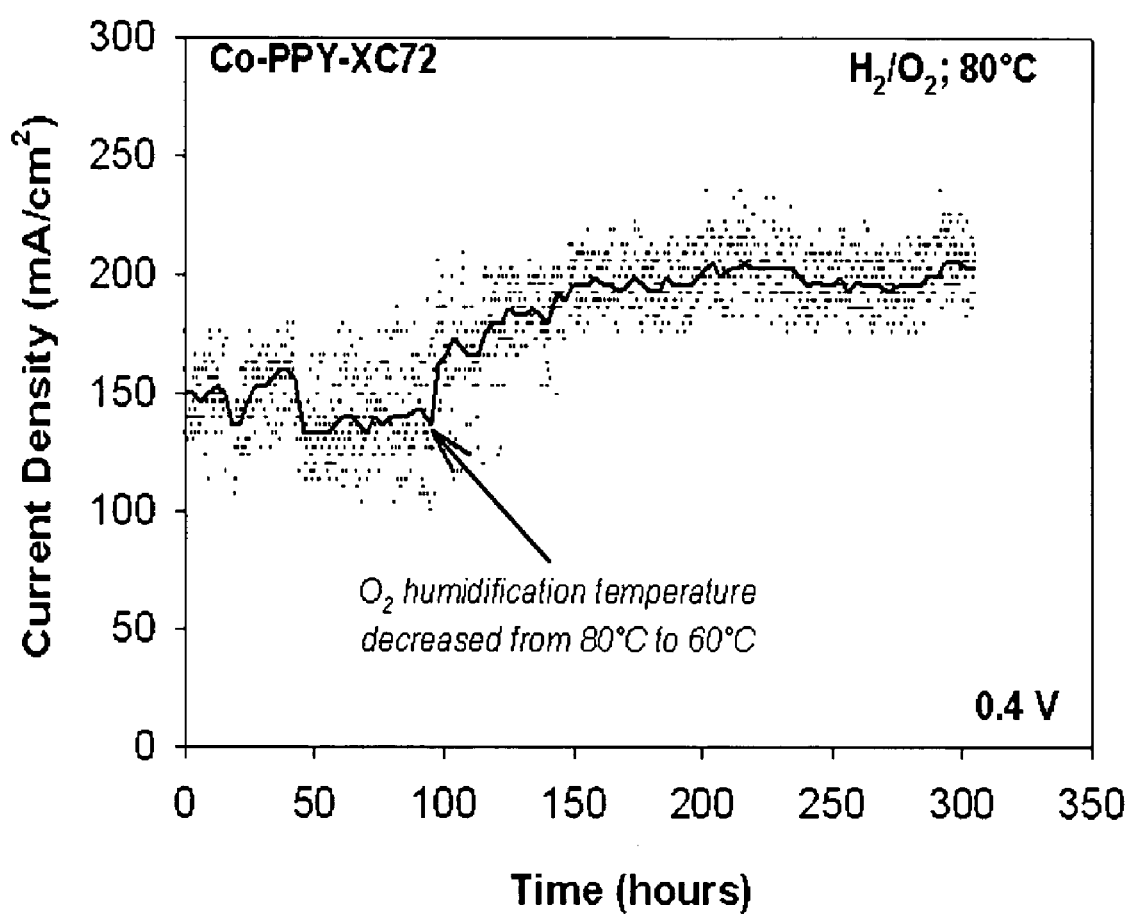
FIG. 19 is a plot of a 300-hour life test at 0.4 V and 80° C. for a $H_2$/air fuel cell having a cobalt-polypyrrole-carbon composite cathode and a platinum-ruthenium black anode.

A plot obtained for a 300-hour life test at 0.4 V for an $H_2$—$O_2$ fuel cell life having a Co—PPY—C is shown in FIG. 19. The life test provides evidence of very good catalyst stability at 0.4 V over an operating time of several hundred hours.

Figure 20:
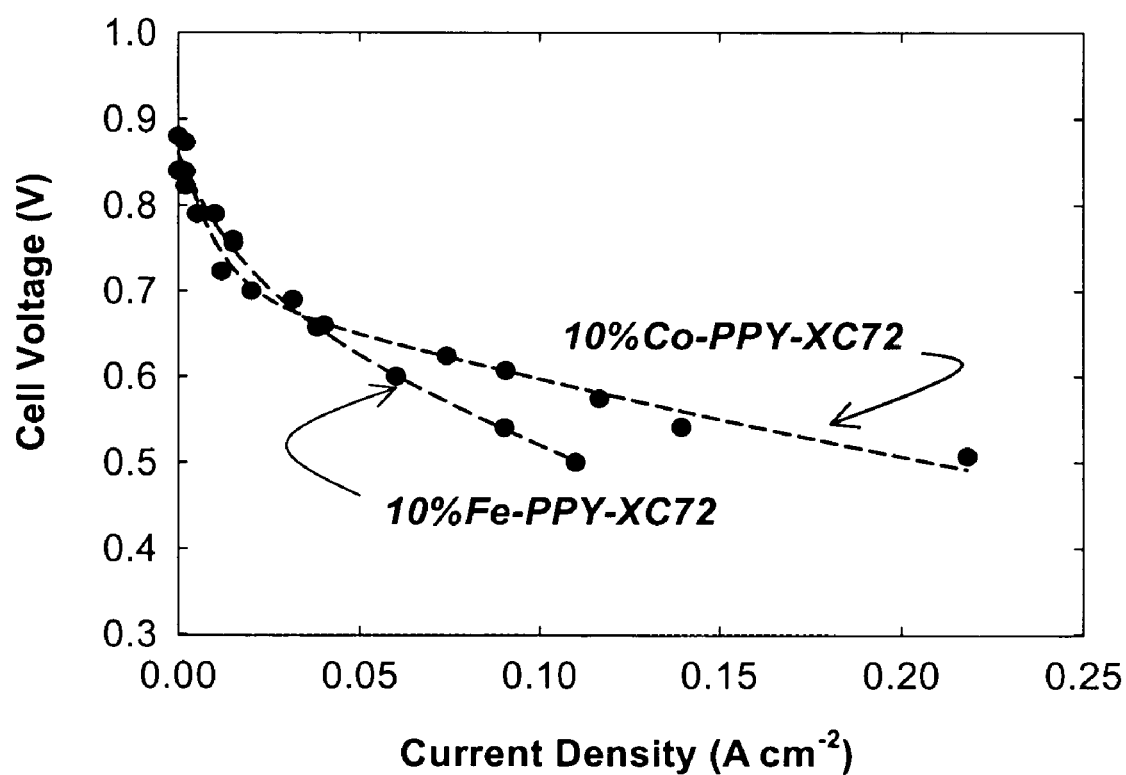
FIG. 20 is a plot of $H_2/O_2$ fuel cell polarization at 80° C. with iron-polypyrrole-carbon composite cathode in reference to $H_2/O_2$ fuel cell polarization with a cobalt-polypyrrole-carbon composite cathode.

An iron-polypyrrole-carbon (Fe—PPY—C) composite was also evaluated as a cathode catalyst in $H_2$—$O_2$ fuel cells. Fuel cell polarization data obtained at 80° C. for Fe—PPY—C and Co—PPY—C cathode catalysts are shown in FIG. 20. As seen in FIG. 20, the Co—PPY—C and Fe—PPY—C composites exhibit similar performance at low fuel cell current densities. Less effective oxygen mass transport in the Fe—PPY—C catalyst limits performance at higher current densities.

EXAMPLE 7

Methanol Tolerance

Methanol was supplied to the DFMC anode at a rate of 1.8 mL/min, and oxygen was supplied to the DFMC Co-polypyrrole-carbon composite cathode. The oxygen was provided at ambient pressure (unlike the hydrogen-oxygen experiments described above) to the cathode and was humidified at 80° C. Methanol was provided at concentrations of 0.5 M, 1.0 M, 5.0 M, and 12 M. The DMFC was tested at 80° C.

Figure 11:
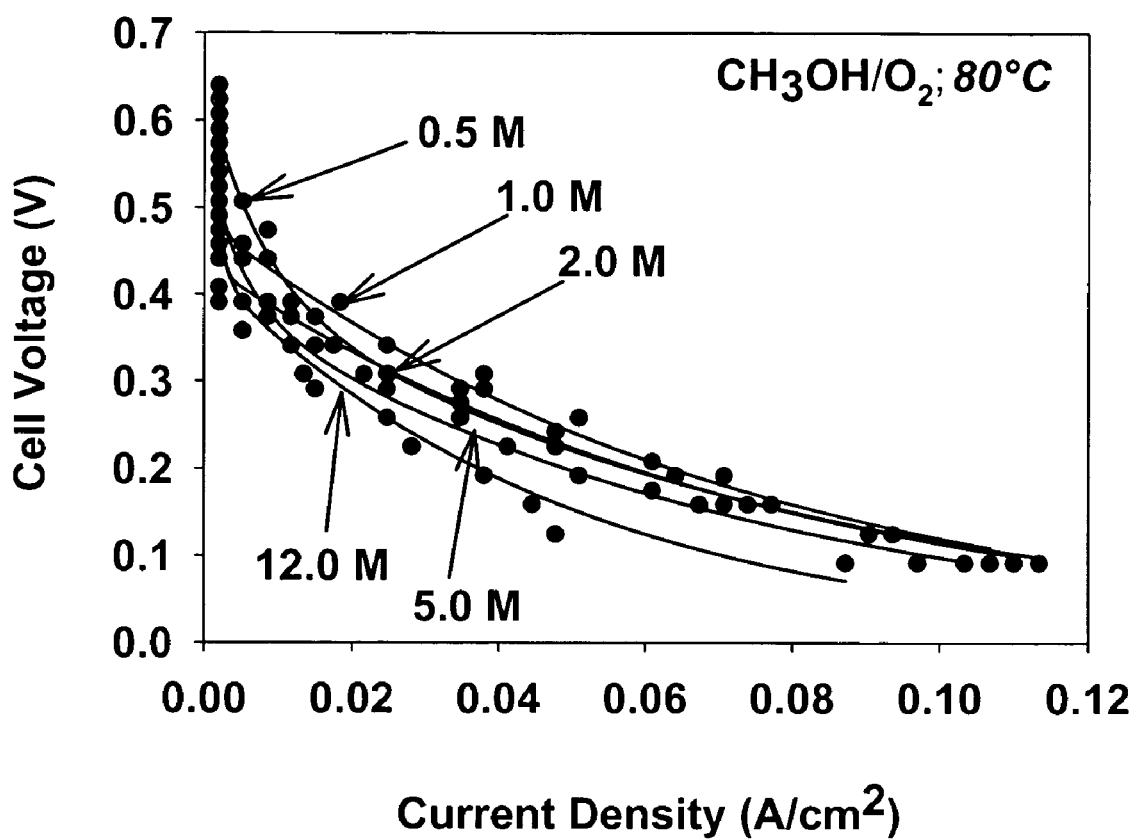
FIG. 11 is a plot of direct methanol fuel cell (methanol-oxygen) polarization at 80° C. obtained with different anode concentrations of methanol, a cobalt-polypyrrole-carbon composite cathode (0.06 mg/cm$^2$ Co), and a commercially available platinum-ruthenium black anode (6.0 mg/cm$^2$ Pt—Ru)

Polarization plots for a methanol-oxygen DMFC having a Co-polypyrrole-carbon composite cathode are shown in FIG. 11. The polarization plots were obtained at 80° C. with different anode concentrations of methanol. The performance of the Co-polypyrrole-carbon composite cathode was independent of methanol concentration. The Co-polypyrrole-carbon composite cathode exhibits slightly lower performance at a methanol concentration of 12 M compared to that observed at other methanol concentrations. This may be due to reduced activity of the DMFC anode at this extreme methanol concentration, rather than methanol intolerance of the Co-polypyrrole-carbon composite cathode.

In a separate experiment, methanol was supplied to the DFMC anode at a rate of 1.8 mL/min, and air was supplied to the DFMC cathode. The air provided to the cathode was humidified at 80° C. and supplied at an ambient pressure. Methanol was provided at concentrations of 0.5 M, 1.0 M, 5.0 M, and 12 M. The DMFC was tested at 80° C.

Figure 12:
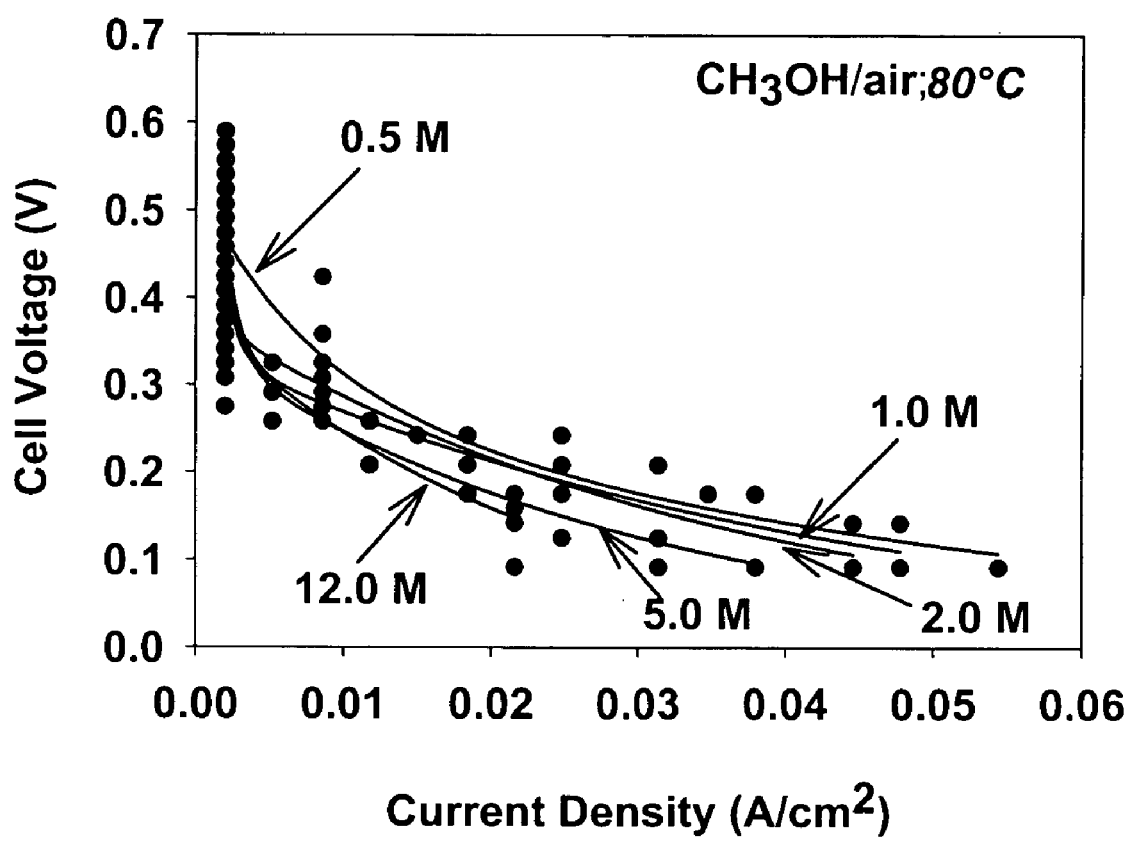
FIG. 12 is a plot of direct methanol fuel cell (methanol-air) polarization at 80° C. obtained with different anode concentrations of methanol, a cobalt-polypyrrole-carbon composite cathode (0.2 mg/cm$^2$ Co), and a commercially available platinum-ruthenium black anode (6.0 mg/cm$^2$ Pt—Ru)

FIG. 12 shows polarization plots for the methanol-air DMFC having a Co-polypyrrole-carbon composite cathode. The polarization plots were obtained at 80° C. with different anode concentrations of methanol. At higher methanol concentrations, the Co-polypyrrole-carbon composite cathode performance exceeds that of platinum cathodes. The Co-polypyrrole-carbon composite cell shows similar performance at methanol of concentrations 5 M and 12 M, but the performance decrease at 5 M methanol was found to be slightly greater in methanol-air than methanol-oxygen.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A method of making a cathode catalyst, wherein the cathode catalyst comprises a composite comprising a heteroatomic polymer and dispersed carbon particles, a transition metal other than platinum linked to the heteroatomic polymer by one of nitrogen, sulfur, phosphorus, and oxygen, and a recast ionomer dispersed throughout the heteroatomic polymer-carbon composite, the method comprising the steps of:
   a. forming the composite comprising a heteroatomic polymer and dispersed carbon particles;
   b. loading the transition metal on the composite comprising a heteroatomic polymer and dispersed carbon particles to form a transition metal composite by:
      i. forming an aqueous dispersion of the composite comprising a heteroatomic polymer and dispersed carbon particles;
      ii. providing a precursor of the transition metal to the aqueous dispersion; and
      iii. reducing the transition metal prior to forming the transition metal composite by adding a reducing agent to the aqueous dispersion; and
   c. blending the recast ionomer with the transition metal composite to form the cathode catalyst.

2. The method according to claim 1, wherein the step of forming the composite comprising a heteroatomic polymer and dispersed carbon particles comprises:
   a. forming a carbon dispersion in water;
   b. providing a heteroatomic monomer; and
   c. polymerizing the heteroatomic monomer by means of a chemical reaction to form the composite comprising a heteroatomic polymer and dispersed carbon particles.

3. The method according to claim 1, wherein the transition metal is selected from the group consisting of cobalt, nickel, chromium, molybdenum, ruthenium, iron, manganese, palladium, vanadium, and combinations thereof.

4. The method according to claim 3, wherein the transition metal is cobalt.

5. The method according to claim 1, wherein the heteroatomic polymer is selected from the group consisting of polypyrrole, polyaniline, polythiophene, polyethylene dioxythiophene, polyfuran, poly(vinylpyridine), polyimide, derivatives thereof, and combinations thereof.

6. The method according to claim 5, wherein the heteroatomic polymer is polypyrrole.

7. The method according to claim 1, wherein the recast ionomer is selected from the group consisting of poly(perflourosulphonic acid), sulfonated styrene-ethylene-butylene-styrene, polystyrene-graft-poly(styrene sulfonic acid), poly(vinylidene fluoride)-graft-poly(styrene sulfonic acid), poly(arylene ether), polyphosphazene, and combinations thereof.

8. The method according to claim 7, wherein the recast ionomer is poly(perflourosulphonic acid).

9. A method of making a membrane electrode assembly for a fuel cell, the membrane electrode assembly comprising: an ionomeric membrane, a cathode catalyst disposed on a first surface of the ionomeric membrane; and an anode catalyst disposed on a second surface of the ionomeric membrane, wherein the cathode catalyst comprises a composite comprising a heteroatomic polymer and dispersed carbon particles, a transition metal other than platinum linked to the heteroatomic polymer by one of nitrogen, sulfur, phosphorus, and oxygen, and a recast ionomer dispersed throughout the composite comprising a heteroatomic polymer and dispersed carbon particles, the method comprising the steps of:
- a. forming the composite comprising a heteroatomic polymer and dispersed carbon particles;
- b. loading the transition metal on the composite comprising a heteroatomic polymer and dispersed carbon particles to form a transition metal composite by:
  - i. forming an aqueous dispersion of the composite comprising a heteroatomic polymer and dispersed carbon particles;
  - ii. providing a precursor of the transition metal to the aqueous dispersion; and
  - iii. reducing the transition metal prior to forming the transition metal composite by adding a reducing agent to the aqueous dispersion;
- c. blending the recast ionomer with the transition metal composite to form the cathode catalyst;
- d. applying the cathode catalyst to the first surface of the ionomeric membrane; and
- e. applying the anode catalyst to a second surface of the ionomeric membrane to form the membrane electrode assembly.

10. The method according to claim 9, wherein the step of applying the cathode catalyst to the first surface of the ionomeric membrane comprises:
- a. forming a cathode catalyst ink, the ink comprising the cathode catalyst; and
- b. applying the cathode catalyst ink to the first surface by one of brush painting, doctor-blading, ultrasonic spraying, air spraying, decal transfer, and screen-printing.

11. The method according to claim 9, wherein the transition metal is selected from the group consisting of cobalt, nickel, chromium, molybdenum, ruthenium, iron, manganese, palladium, vanadium, and combinations thereof.

12. The method according to claim 11, wherein the transition metal is cobalt.

13. The method according to claim 9, wherein the heteroatomic polymer is selected from the group consisting of polypyrrole, polyaniline, polythiophene, polyethylene dioxythiophene, poly(vinylpyridine), polyimide, derivatives thereof, and combinations thereof.

14. The method according to claim 13, wherein the heteroatomic polymer is polypyrrole.

15. The method according to claim 9, wherein the recast ionomer is selected from the group consisting of poly(perflourosulphonic acid), sulfonated styrene-ethylene-butylene-styrene, polystyrene-graft-poly(styrene sulfonic acid), poly(vinylidene fluoride)-graft-poly(styrene sulfonic acid), poly(arylene ether), polyphosphazene, and combinations thereof.

16. The method according to claim 15, wherein the recast ionomer is poly(perflourosulphonic acid).

17. The method according to claim 9, wherein the ionomeric membrane is selected from the group consisting of poly(perflourosulphonic acid), sulfonated styrene-ethylene-butylene-styrene, polystyrene-graft-poly(styrene sulfonic acid), poly(vinylidene fluoride)-graft-poly(styrene sulfonic acid), poly(arylene ether), polyphosphazene, and combinations thereof.

18. The method according to claim 9, wherein the step of applying the cathode catalyst to the first surface of the ionomeric membrane comprises:
- a. applying a first portion of the cathode catalyst to the first surface of the ionomeric membrane;
- b. applying a second portion of the cathode catalyst to the diffusion layer; and
- c. disposing the first surface of the ionomeric membrane comprising the first portion of the cathode catalyst over the diffusion layer comprising the second portion of the cathode catalyst.

19. The method according to claim 9, wherein the step of applying the anode catalyst to the second surface of the ionomeric membrane comprises:
- a. blending a first portion of the anode catalyst with a recast ionomer;
- b. applying a first portion of the anode catalyst to the second surface of the ionomeric membrane;
- c. applying a second portion of the anode catalyst to the diffusion layer; and
- d. disposing the second surface of the ionomeric membrane comprising the first portion of the anode catalyst over the diffusion layer comprising the second portion of the anode catalyst.

20. A method of making a membrane electrode assembly far a fuel cell, the membrane electrode assembly comprising: a diffusion layer, a cathode catalyst disposed on a first surface of the diffusion layer; wherein the cathode catalyst comprises a composite comprising a heteroatomic polymer and dispersed carbon particles, a transition metal other than platinum linked to the heteroatomic polymer by one of nitrogen, sulfur, phosphorus, and oxygen, and a recast ionomer dispersed throughout the composite comprising a heteroatomic polymer and dispersed carbon particles, the method comprising the steps of:
- a. forming the composite comprising a heteroatomic polymer and dispersed carbon particles;
- b. loading the transition metal on the composite comprising a heteroatomic polymer and dispersed carbon particles to form a transition metal composite by:
  - i. forming an aqueous dispersion of the composite comprising a heteroatomic polymer and dispersed carbon particles;
  - ii. providing a precursor of the transition metal to the aqueous dispersion; and
  - iii. reducing the transition metal prior to forming the transition metal composite by adding a reducing agent to the aqueous dispersion;
- c. blending the recast ionomer with the transition metal composite to form the cathode catalyst;
- d. applying the cathode catalyst to the first surface of the diffusion layer.

* * * * *